United States Patent [19]

Ono

[11] 4,384,242

[45] May 17, 1983

[54] SPEED CONTROL SYSTEMS OF SYNCHRONOUS MOTORS

[75] Inventor: Tadahiro Ono, Shizuoka, Japan

[73] Assignees: Toshiba Kikai Kabushiki Kaisha; Kabushiki Kaisha Toei Denki Seisakusho, both of Tokyo, Japan

[21] Appl. No.: 270,116

[22] Filed: Jun. 3, 1981

[30] Foreign Application Priority Data

Jun. 12, 1980 [JP] Japan .................................. 55-79254

[51] Int. Cl.³ .............................................. H02P 5/40
[52] U.S. Cl. .................................... 318/721; 318/661
[58] Field of Search ............... 318/661, 662, 721, 701, 318/702

[56] References Cited

U.S. PATENT DOCUMENTS

| | | | |
|---|---|---|---|
| 3,775,649 | 11/1973 | Bayer et al. | 318/721 |
| 3,988,653 | 10/1976 | Clurman | 318/702 |
| 4,028,600 | 6/1977 | Blaschke et al. | 318/696 |
| 4,085,355 | 4/1978 | Fradella | 318/721 |
| 4,347,471 | 8/1982 | Kohzai et al. | 318/661 |
| 4,357,569 | 11/1982 | Iwakane et al. | 318/661 |

*Primary Examiner*—David Smith, Jr.
*Attorney, Agent, or Firm*—Koda and Androlia

[57] ABSTRACT

In a speed control system of a synchronous motor, a pulse modulated signal containing a signal representing rotational angle of the motor is formed to control the speed. The pulse modulated signal is passed through a synchronous rectifier to obtain currents supplied to stator windings of the motor.

8 Claims, 9 Drawing Figures

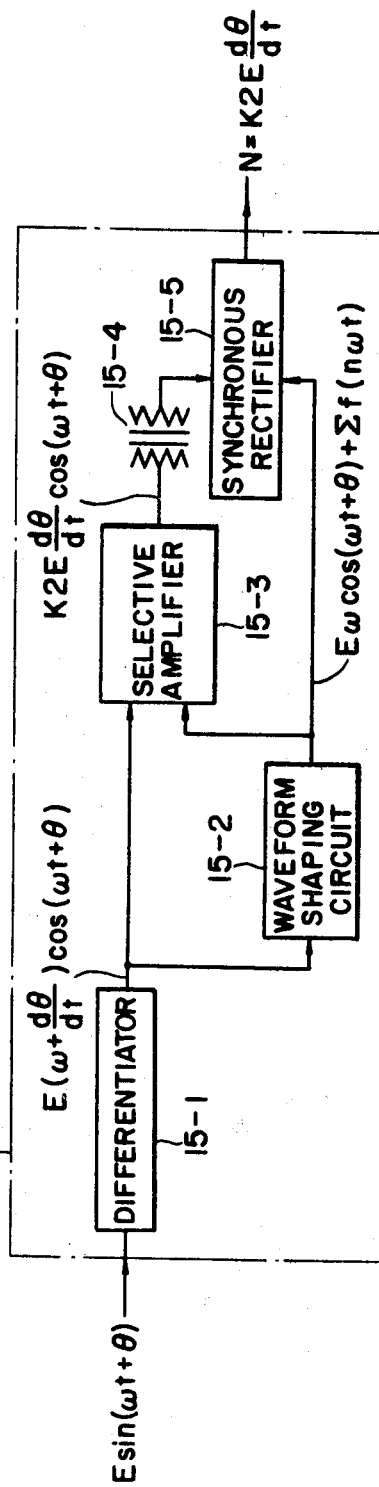
F I G. 5
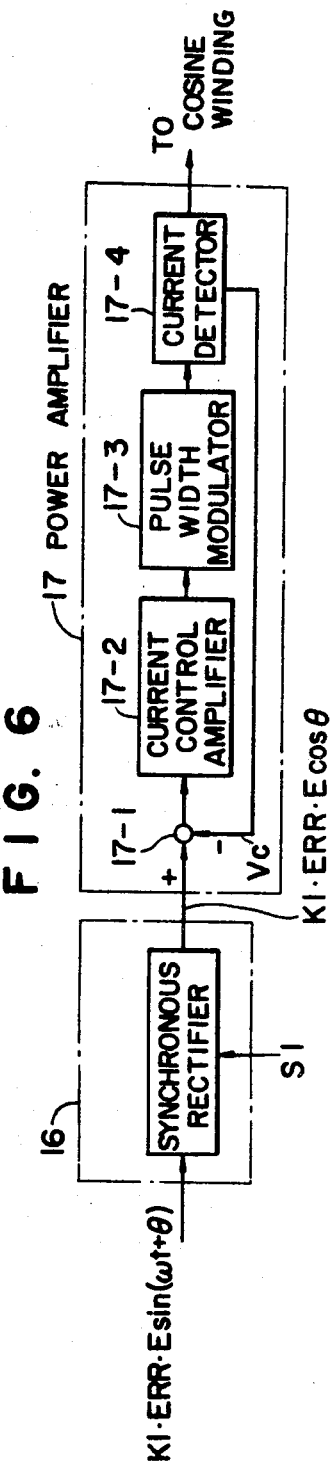
F I G. 6

4,384,242

SPEED CONTROL SYSTEMS OF SYNCHRONOUS MOTORS

BACKGROUND OF THE INVENTION

This invention relates to a speed control system of a synchronous motor, characterized in that it utilizes such detector as an Inductsyn sold by Inductsyn Corp., U.S.A. or a resolver which produces a phase modulated signal used as a feedback signal representing the rotation or speed and the rotational angle of the motor. In a synchronous motor provided with a permanent magnet mounted on a rotor for producing a rotating field as in a brushless DC motor, and a stator winding, the torque generated by the motor somewhat varies depending upon the rotational position of the permanent magnet so that where such synchronous motor is used as a servomotor there is a disadvantage that the generated torque varies, especially at the time of starting.

SUMMARY OF THE INVENTION

It is an object of this invention to provide an improved speed control system of a synchronous motor capable of rotating the motor with a constant torque by using a signal from such detector as a resolver or an Inductsyn which produces a phase modulated signal utilized as a position feedback signal of the motor.

Another object of this invention is to provide a speed control system of a synchronous motor in which the speed feedback signal is obtained directly from the phase modulated signal, that is both position and speed feedback signals are obtained from one detector.

According to this invention, there is provided a speed control system of a synchronous motor provided with a pair of stator windings which are displaced 90° electrically and mechanically, and a rotor, characterized in that the speed control system comprises means driven by the rotor for producing a phase modulated signal containing a component representing a rotational angle of the rotor; speed signal converting means which forms a signal corresponding to a differential of the rotational angle; means for producing a speed instruction signal corresponding to a rotational speed of the rotor; means for producing an error signal corresponding to a difference between the signal formed by the speed signal converting means and the speed instruction signal; a multiplier for multiplying the phase modulated signal with the error signal; means for producing two reference signals having a phase difference of 90°; and synchronous rectifier means for rectifying an output of the rectifier according to the reference signals for producing currents supplied to the stator windings of the motor.

BRIEF DESCRIPTION OF THE DRAWINGS

In the accompanying drawings:

FIG. 5 is a block diagram showing a modification of the speed control system in which a speed signal detector is changed to a differentiating circuit;

FIG. 6 is a block diagram showing the detail of the synchronous rectifier and the power amplifier shown in FIG. 1;

DESCRIPTION OF THE PREFERRED EMBODIMENTS

Figure 1:
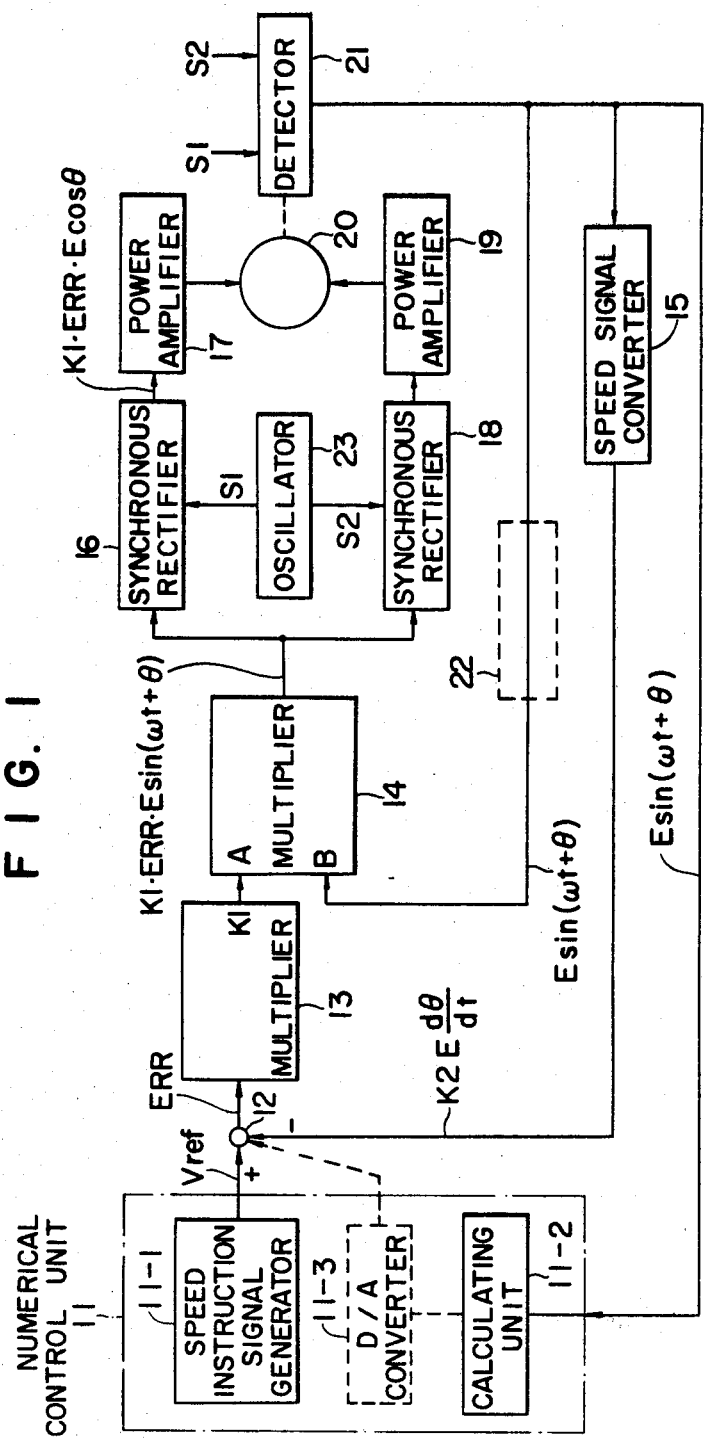
FIG. 1 is a block diagram showing the electric connection of the speed control system according to this invention.

In a preferred embodiment of this invention shown in FIG. 1, there is provided a numerical control unit 11 comprising a speed instruction signal generator 11-1 for producing an instruction voltage $V_{ref}$ corresponding to the rotational speed of a synchronous motor 20 and a calculating unit 11-2 which calculates a position feedback quantity. In this example, the calculating unit 11-2 is inputted with a phase modulated signal $E \sin(\omega t + \theta)$ where E represents voltage and $\theta$ a rotational angle or position of the rotor of the motor.

An adder (or subtractor) 12 is provided to produce a difference or an error signal ERR between the speed instruction signal $V_{ref}$ and an output $K\,2E(d\theta/dt)$ produced by a speed signal converter 15, where K represents a constant. The error signal ERR is multiplied with a coefficient K1 by an amplifier 13 and the output thereof is applied to an input terminal A of a multiplier 14 with its other input terminal B connected to receive the phase modulated signal $E \sin(\omega t + \theta)$ from a detector 21. Thus, this output of the amplifier 14 is shown by $$K1 \cdot ERR \cdot E \sin(\omega t + \theta) = EK1\left(V_{ref} - K2E\frac{d\theta}{dt}\right)\sin(\omega t + \theta)$$

A synchronous rectifier 16 which operates as a phase discriminator is provided to rectify the output of the multiplier 14 in synchronism with a reference signal S1. The output of the synchronous rectifier 16 is amplified by a power amplifier 17 and then applied to one stator winding of the synchronous motor 20.

A portion of the output of multiplier 14 is also applied to another synchronous rectifier (phase discriminator) 18 to be rectified in synchronism with a reference signal S2. After being amplified by a power amplifier 19 the output of the synchronous rectifier 18 is applied to another stator winding of the motor. Reference signals S1 and S2 are given by an oscillator 23 and take the form of sine wave or rectangular wave voltages having a phase difference of 90°.

In the case of the sine wave voltage $$S1 = E \sin(\omega t + \theta)$$

$$S2 = E \cos(\omega t + \theta)$$

As above described, the purpose of the detector 21 is to produce the phase modulated signal $E \sin(\omega t + \theta)$ so that when it is driven by the rotor of motor 20 it can be substituted by a resolver.

Where the phase modulated signal is to be produced by a body linearly moved by the motor 20, the linear type Inductsyn may be used. The detector 21 is supplied with signals S1 and S2 acting as exciting voltages.

Figure 2:
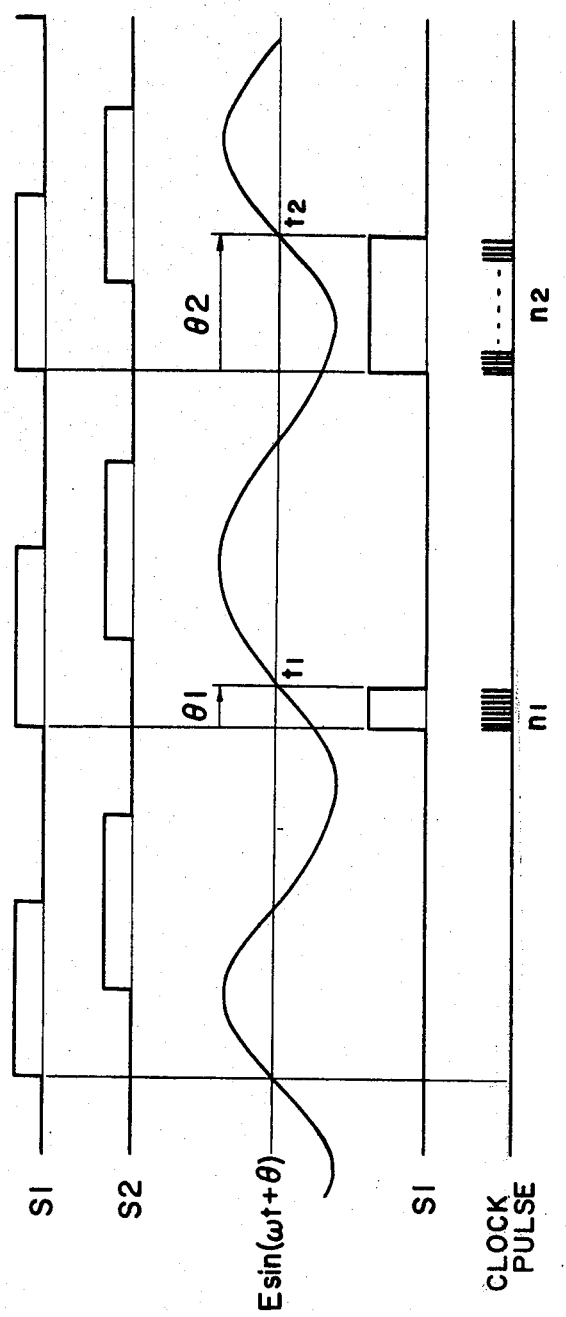
FIG. 2 is a timing chart for explaining the operation of a prior art system of forming a speed signal from a phase modulated signal.

The purpose of the speed signal converter 15 is to obtain a speed signal regarding the rotational angle $\theta$ from the phase modulated signal $E \sin(\omega t + \theta)$, that is a differentiated signal $d\theta/dt$. There are many methods of forming the speed signal. For example, in a known method as shown in FIG. 2, the rotational angle $\theta$ is derived out by a digital processing and then differentiating the rotational angle $\theta$. This method, however, necessitates a complicated circuit construction, so that it is advantageous to use a circuit construction in which the signal is subjected to an analogue processing as shown in FIG. 5.

The output $K2E(d\theta/dt)$ (see FIG. 5) of the speed signal converter 15 is applied to the adder 12 to form the error signal ERR. A phase adjuster 22 shown by a dotted line block may be inserted between the adder 12 and the speed signal converter 15 in a case where it is difficult to accurately mount the detector 21 at an angular position at which a maximum torque would be produced. The detail of the phase adjuster 22 will be described later with reference to FIG. 9. For the sake of description, instead of using the speed signal converter 15, a case wherein calculating unit 11-2 is used to differentiate $\theta$ will be described. As shown by the timing chart shown in FIG. 2, in the speed signal converter, during phase angles or intervals $\theta_1$ and $\theta_2$ between the building up of one reference signal S1 (rectangular wave) and instants $t_1$ and $t_2$ at which the phase modulated signal $E \sin(\omega t + \theta)$ passes through zero points the numbers n1 and n2 of clock pulses are counted. A quantity $\Delta n$ representing the absolute value of the difference between n2 and n1 corresponds to the angle of rotation of the motor 20 during one period $1/(\omega/2\pi) = \Delta t$. Accordingly, where the angular velocity $\omega$ is large sufficient to accurately detect the speed, $\Delta n$ corresponds to the angle of rotation, that is the speed during one period $\Delta t$. As a consequence, when $\Delta n$ is calculated by the calculating unit 11-2 and then converted into an analogue quantity by a digital analogue converter 11-3, the same function can be provided as that of the speed signal converter 15.

Figure 3:
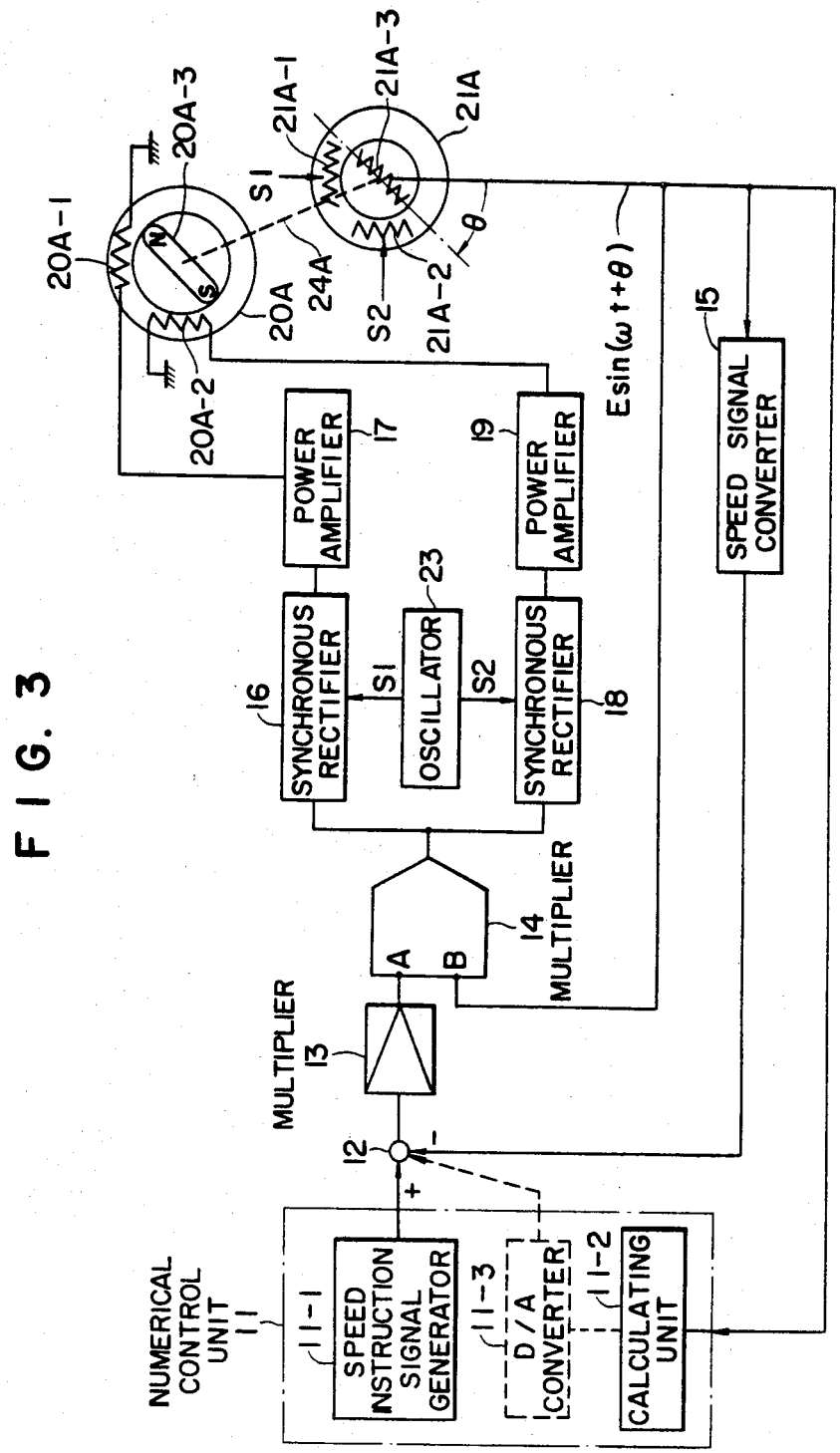
FIG. 3 is a block diagram showing a modified embodiment of this invention utilizing a magnet motor and a resolver.

FIG. 3 shows another embodiment of this invention in which a two pole DC brushless motor 20A is used as a synchronous motor, and in which elements corresponding to those shown in FIG. 1 are designated by the same reference characters. The rotor 20A-3 of the motor 20A is constituted by a permanent magnet, while the stator windings are constituted by a cosine winding 20A-1 and a sine winding 20A-2 having an electrical and mechanical phase difference of 90°.

A resolver 21A acting as the detector 21 shown in FIG. 1 is mounted on the shaft 24A of the rotor 20A-3 and rectangular wave signals S1 and S2 are applied to the stator windings 21A-1 and 21A-2 from oscillator 23 shown in FIG. 1. Thus, a phase modulated signal $E \sin(\omega t + \theta)$ is induced in the secondary winding 21A-3 of the resolver 21A, where E represents the induced voltage and $\theta$ the angular position of the rotor 20A-3.

Figure 4:
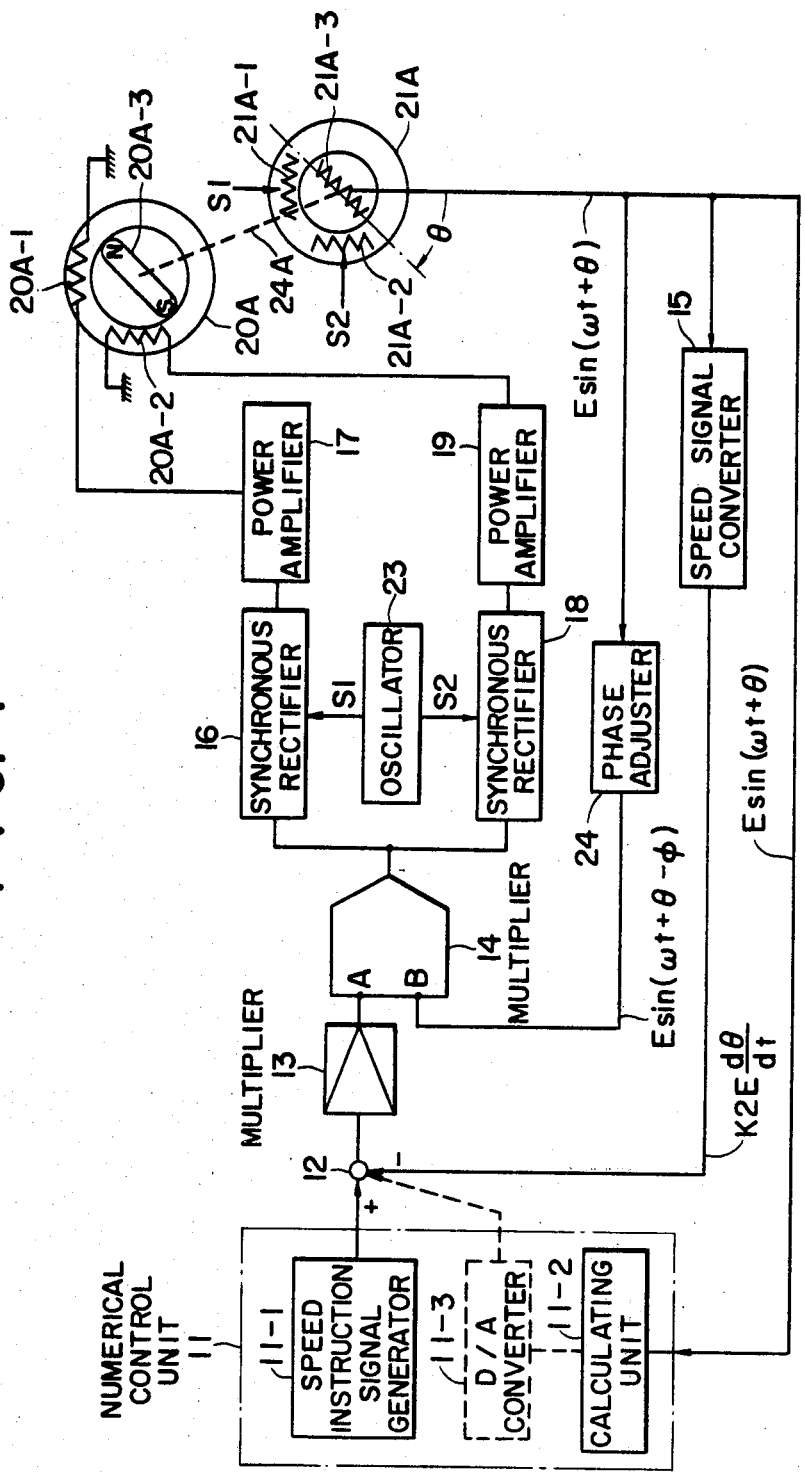
FIG. 4 is a block diagram showing another embodiment of this invention.

In still another modification shown in FIG. 4, the phase modulated signal $E \sin(\omega t + \theta)$ produced by the resolver 21A is applied to the multiplier 14 after being adjusted its phase with a phase adjuster 24 which forms a signal $E \sin(\omega t + \theta - \psi)$ where $\psi$ represents the amount of the phase adjusted. Provision of the phase adjuster 24 can compensate for any angular misalignment of the secondary winding 21A-3 of the resolver 21A and the permanent magnet 20A-3 of the motor 20A. Thus, the electrical phase adjuster eliminates difficult mechanical fine positional alignment of two rotors 20A-3 and 21A-3.

The phase adjuster 24 can be constituted by a phase advancing or lagging circuit comprising resistors and capacitors as will be described later with reference to FIG. 9.

FIG. 5 is a block diagram showing one example of the speed signal converter 15. As shown, the phase modulated signal $E \sin(\omega t + \theta)$ is applied to a differentiator 15-1, so that it produces an output signal $$E\left(\omega + \frac{d\theta}{dt}\right) \cos\theta (\omega t + \theta)$$

which is applied to a selective amplifier 15-3 and a waveform shaping circuit 15-2 which shapes the output of the differentiator 15-1 into a rectangular waveform, which is expressed as follows in terms of Fourier series:

$$E\omega \cos(\omega t + \theta) + \Sigma f(n\omega t)$$

The selective amplifier 15-3 amplifies a component of the fundamental frequency $\omega/2\pi$ of the difference between the outputs of the differentiator 15-1 and of the waveform shaping circuit 15-2. Thus, the selective amplifier 15-3 amplifies by a factor of K2 only the component $\omega/2\pi$ of the difference $$[E\omega\cos(\omega t + \theta) + E\frac{d\theta}{dt}\cos(\omega t + \theta)] -$$

$$[E\omega\cos(\omega t + \theta) + \Sigma f(n\omega t)] =$$

$$E\frac{d\theta}{dt}\cos(\omega t + \theta) - \Sigma f(n\omega t)$$

and produces an output $K2E d\theta/dt) \cos(\omega t + \theta)$. This output is rectified by a synchronous rectifier 15-5 through a transformer 15-4 by using the output signal of the waveform shaping circuit 15-2 as a reference signal. Consequently, the synchronous rectifier 15-5 produces an output $$N = K2E \frac{d\theta}{dt}$$

FIG. 6 shows the detail of the synchronous rectifier 16 and the power amplifier 17 shown in FIG. 1. The synchronous rectifier 16 is supplied with the output $$K1 \cdot ERR \cdot E \sin \cdot (\omega t + \theta) =$$

$$K1 \cdot E\left(V_{ref} - K2E\frac{d\theta}{dt}\right) \sin(\omega t + \theta)$$

of the multiplier 14 shown in FIG. 1 and the reference signal $S1 = \sin \omega t$ or a rectangular wave synchronous therewith, so that the rectifier produces an output $K1 \cdot ERR \cdot E \cos \theta$.

The power amplifier 17 comprises an adder 17-1, a current control amplifier 17-2, a pulse width modulator 17-3 for subjecting the output of the amplifier 17-2 to a pulse width modulation and a current detector 17-4, and applies amplified current to the cosine winding of the motor 20. The current detector 17-4 feedbacks detected current to the adder 17-1.

Figure 7:
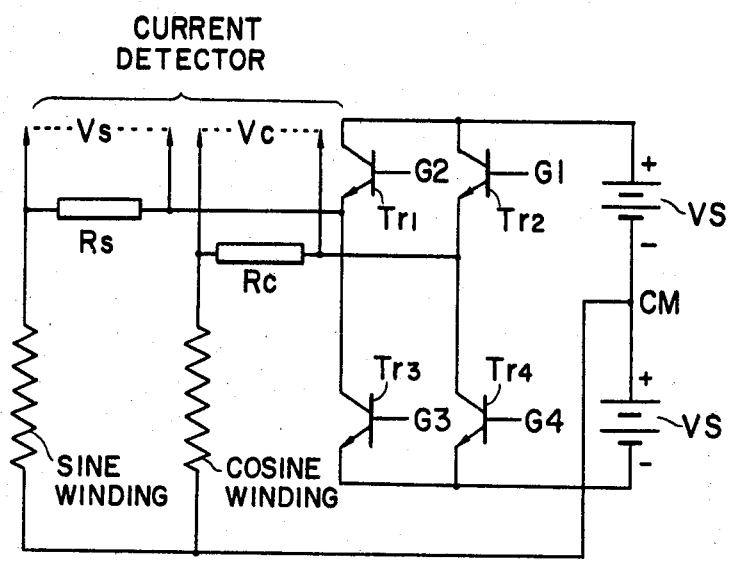
FIG. 7 is a connection diagram showing the connection of the current detector shown in FIG. 6 and the sine and cosine windings of the synchronous motor.

FIG. 7 shows the connection of the pulse width modulator 17-3, current detector 17-4, the cosine and sine windings of the motor 20. As shown, pulse width modulated gate signals G1 through G4 produced by the pulse with modulator 17-3 are respectively applied to the base electrodes of power transistors $T_{r1}$–$T_{r4}$ so as to supply current to the cosine winding when transistors G1 and G4 are ON and to supply current to the sine winding when transistors G2 and G3 are ON.

Thus, for example, when transistor $T_{r1}$ is ON current flows through the cosine winding from the positive terminal of a DC source VS via the emitter collector path of transistor $T_{r1}$, a resistor $R_C$, and the cosine winding to the midpoint CM of the source VS. In the same manner, when transistor $T_{r2}$ is ON current flows through the sine winding via resistor $R_S$. When transistor $T_{r3}$ or $T_{r4}$ is ON current flows through sine or cosine winding and resistors $R_S$ or $R_C$ in the opposite direction. In other words, transistors $T_{r1}$ through $T_{r4}$ operate as switching elements to pass alternating currents through sine and cosine windings. Resistors $R_C$ and $R_S$ correspond to the current detector 17-4 shown in FIG. 6 and the voltages $V_C$ and $V_S$ across these resistors are used as the voltage fed back to adder 17-1.

Figure 8:
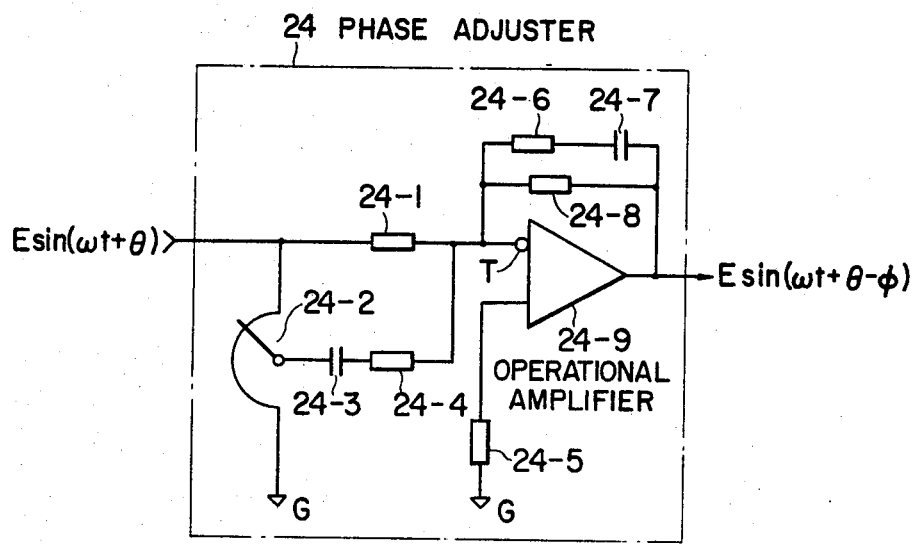
FIG. 8 is a connection diagram showing the phase shifter shown in FIG. 4.

FIG. 8 shows the detail of the phase adjuster 24 shown in FIG. 4 (22 shown in FIG. 1) which comprises an operational amplifier 24-9 having input terminal T supplied with the output $E \sin(\omega t + \theta)$ of the resolver 21A through an input resistor 24-1 which is shunted by a serially connected variable resistor 24-2, a capacitor 24-3 and a resistor 24-4. Between the input and output terminals of the operational amplifier 24-9 is connected a feedback circuit constituted by resistors 24-6 and 24-8 and a capacitor 24-7 which are connected as shown. By adjusting the variable resistor 24-2, the operational amplifier 24-9 produces an output $-E \sin(\omega t + \theta - \psi)$ where $\psi$ represents a positive or a negative phase angle that is advance or lag. The other input terminal of the operational amplifier 24-4 is grounded through a resistor 24-5.

Figure 9:
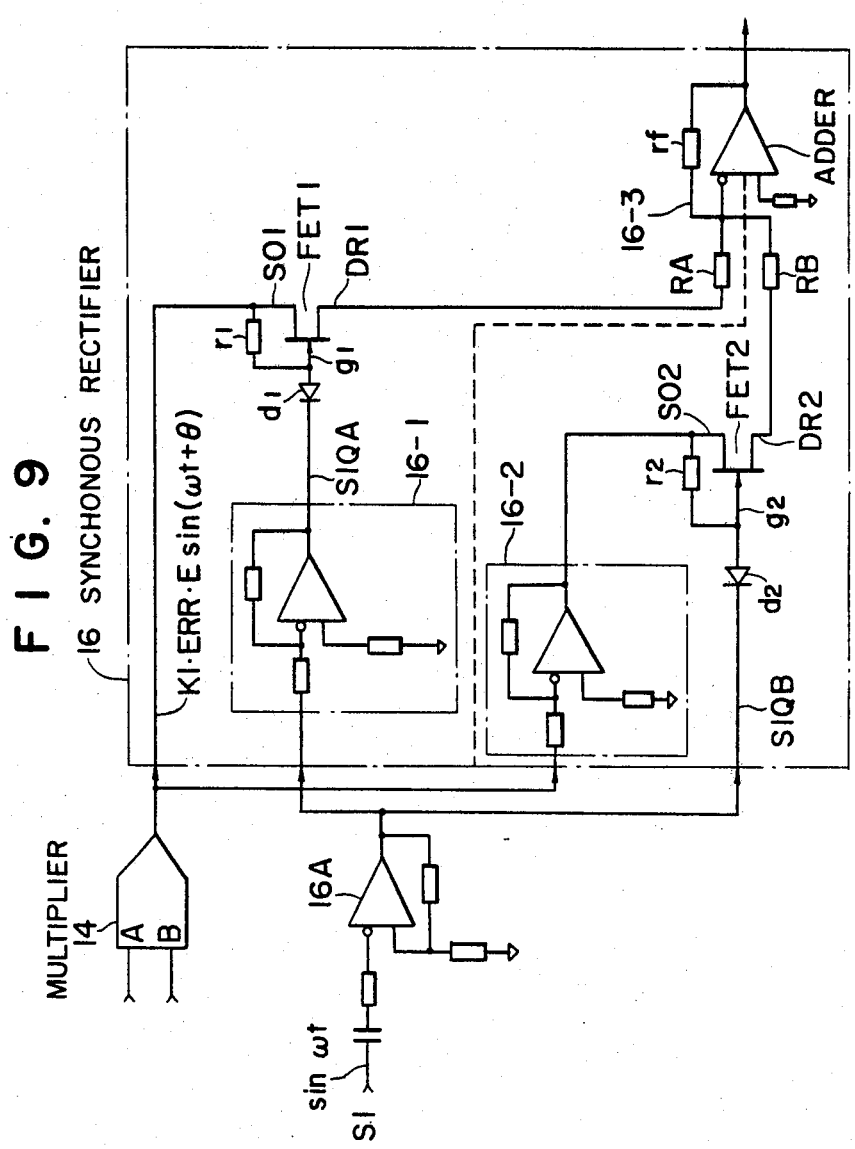
FIG. 9 is a connection diagram showing the detail of the synchronous rectifier.

FIG. 9 shows the detail of one example of the synchronous rectifier 16 shown in FIGS. 1 and 6. It comprises a waveform shaper 16A which converts an input reference signal S1, that is $\sin \omega t$ into a rectangular wave, amplifiers 16-1 and 16-2 which shift the phases of their input signals by $2\pi$ respectively. The amplifier 16-1 is supplied with the output of the waveform shaper 16A, while the amplifier 16-2 is supplied with the output of the multiplier 14. The gate electrode of a field effect transistor FET1 is connected to the output of the amplifier 16-1 via a diode d1 so that when the output of the amplifier 16-1 is "1" (high level) the transistor FET1 turns ON. During an interval in which the rectangular wave output SIQA of the amplifier 16-1 is "1" the output K1·ERR·E $\sin(\omega t + \theta)$ is positive so that this output would be inputted to one input of an adder 16-3 in the form of an operational amplifier via the source and drain electrodes SO1 and DR1 and a resistor RA. Resistors r1 and r2 are connected between the source and gate electrodes of respective transistors FET1 and FET2 and a resistor $r_f$ is connected between the input and output terminals of the adder 16-3 to determine its amplification coefficient. The gate electrode g2 of another field effect transistor FET2 is supplied with the output SIQB of the waveform shaper 16A via a diode D2, the source electrode SO2 is connected to receive the output of the amplifier 16-2 and the drain electrode DR2 is connected to the input terminal of the adder 16-3 via resistor RB. When the output signal SIQA is "0", the output SIQB of the waveform shaper 16A is "1" (high level). At this time, the output of the multiplier 14 is also negative which is inverted by amplifier 16-2 to become positive and applied to the source electrode SO2 of the field effect transistor FET2 thus rendering ON the same. Consequently, its drain output is applied to the adder 16-3 so that this adder produces an output corresponding to a current obtained by synchronously rectifying (full wave rectification) the output of the multiplier 14 in accordance with the reference signal S1, that is sine $\omega t$.

As above described according to this invention since such detector as a resolver or an Inductsyn which produces a phase modulated signal is used as the detector to obtain a position signal and a speed signal it is not necessary to use a tachometer generator to obtain the speed signal as in the conventional speed control system.

Moreover, according to this invention, since the phase modulated signal produced by the detector is applied to one input of a multiplier, the output thereof is synchronously rectified and then supplied to the sine and cosine windings of a synchronous motor, the control system can be constructed with an analogue circuit much simpler than the prior art control system.

I claim:

1. A speed control system of a synchronous motor provided with a plurality of stator windings which are displaced electrically and mechanically by predetermined angles and a rotor, comprising:

means driven by said rotor for producing a phase modulated signal $E \sin(\omega t + \theta)$, where E represents voltage, $\omega = 2\pi f$, $\theta$ represents a rotational angle of said motor and f a frequency;

speed signal converting means which forms a signal corresponding to a differential of said rotational angle;

means for producing a speed instruction signal corresponding to a rotational speed of said rotor;

means for producing an error signal corresponding to a difference between said signal formed by said speed signal converting means and said speed instruction signal;

a multiplier for multiplying said phase modulated signal with said error signal;

means for producing a plurality of reference signals having a phase difference of said predetermined angles; and synchronous rectifier means for rectifying an output of said multiplier according to said reference signals for producing currents supplied to said stator windings of said motor.

2. The speed control system according to claim 1 which further comprises a phase adjuster connected between said multiplier and said phase modulated signal producing means.

3. The speed control system according to claim 1 wherein said speed signal converting means comprises a differentiator supplied with said phase modulated signal, a wave form shaping circuit connected to receive an output of said differentiator, a selective amplifier for amplifying difference between outputs of said differentiator and said wave form shaping circuit and a synchronous rectifier for rectifying an output of said selective amplifier in accordance with the output of said wave form shaping circuit.

4. The speed control system according to claim 1 which further comprises a calculating unit which calculates an angle of rotation of said rotor during one period, and a digital analogue converter for converting an output of said calculating unit into an analogue quantity which is applied to said error signal producing means.

5. The speed control system according to claim 1 wherein said motor comprises a rotor including a permanent magnet, said stationary windings comprise a sine winding and a cosine winding which are displaced 90° electrically and mechanically, and wherein said phase modulated signal producing means comprises a resolver provided with a pair of stator windings excited by said reference signals and a rotor winding rotated by said rotor of the motor to produce said phase modulated signal.

6. The speed control system according to claim 1 which further comprises a power amplifier connected between said synchronous rectifier and one of said stator windings, said power amplifier comprising a current control amplifier connected to an output terminal of said synchronous rectifier, a pulse width modulator for subjecting an output of said current control amplifier to a pulse width modulation and a current detector connected between said pulse width modulator and said one stator winding for feeding back detected current to an input terminal of said current control amplifier.

7. The speed control system according to claim 2 wherein said phase adjuster comprises an operational amplifier with one input terminal connected to receive said phase modulated signal through a resistor, a series circuit including a variable resistor and a capacitor and connected across said resistor, and a feedback circuit connected between output and input terminals of said operational amplifier.

8. The speed control system according to claim 1 wherein said synchronous rectifier means comprises a first amplifier (16-1) for amplifying one of said reference signals, a second amplifier (16-2) for amplifying an output of said multiplier, a first field effect transistor (FET1) with its gate electrode connected to an output terminal of said first amplifier and source electrode connected to the output of said multiplier, a second field effect transistor (FET2) with its gate electrode supplied with said reference signal and source electrode connected to an output terminal of said second amplifier, and an adder (16-3) supplied with drain electrode outputs of said first and second field effect transistors.

* * * * *